(12) United States Patent
Rubin et al.

(10) Patent No.: US 8,333,858 B2
(45) Date of Patent: Dec. 18, 2012

(54) METHOD FOR FABRICATING CURVED THERMOPLASTIC COMPOSITE PARTS

(75) Inventors: Alexander M. Rubin, St. Louis, MO (US); James R. Fox, Florissant, MO (US); Randall D. Wilkerson, O'Fallon, MO (US)

(73) Assignee: The Boeing Company, Chicago, IL (US)

( * ) Notice: Subject to any disclaimer, the term of this patent is extended or adjusted under 35 U.S.C. 154(b) by 906 days.

(21) Appl. No.: 11/584,923

(22) Filed: Oct. 20, 2006

(65) Prior Publication Data

US 2007/0175575 A1    Aug. 2, 2007

Related U.S. Application Data

(63) Continuation-in-part of application No. 11/347,122, filed on Feb. 2, 2006, now Pat. No. 7,807,005.

(51) Int. Cl.
*B32B 37/10* (2006.01)

(52) U.S. Cl. ........ 156/212; 156/285; 156/200; 156/201; 156/214; 156/221; 264/171.11; 264/171.12; 264/171.13; 264/171.14; 264/171.15; 264/171.16; 264/171.17; 264/241; 264/246; 264/250; 264/257; 264/258; 264/294; 264/297.6; 264/297.7; 264/319; 264/320; 264/321

(58) Field of Classification Search .................. 156/212, 156/214, 221, 285, 199, 200, 201; 264/171.11–171.17, 241, 246, 250, 257, 264/258, 294, 297.6, 297.7, 319, 320, 321

See application file for complete search history.

(56) References Cited

U.S. PATENT DOCUMENTS

| | | | |
|---|---|---|---|
| 2,440,228 A | 4/1948 | Yardeny et al. | |
| 2,708,288 A | 5/1955 | Fuller et al. | |
| 4,061,817 A | 12/1977 | Maxel | |
| 4,151,031 A * | 4/1979 | Goad et al. | 156/201 |
| 4,414,269 A | 11/1983 | Lubowitz et al. | |
| 4,462,946 A * | 7/1984 | Goldsworthy | 264/442 |
| 4,571,355 A | 2/1986 | Elrod | |
| 4,608,220 A | 8/1986 | Caldwell et al. | |
| 4,674,712 A | 6/1987 | Whitener et al. | |
| 4,749,613 A * | 6/1988 | Yamada et al. | 442/366 |
| 4,818,460 A | 4/1989 | Nied | |
| 4,913,910 A | 4/1990 | McCarville et al. | |
| 5,021,283 A | 6/1991 | Takenaka et al. | |

(Continued)

FOREIGN PATENT DOCUMENTS

BE    834458    2/1976

(Continued)

OTHER PUBLICATIONS

PCT Search Report and Written Opinion for PCT/US 2007/018611.*

(Continued)

*Primary Examiner* — Christopher Schatz
(74) *Attorney, Agent, or Firm* — Yee & Associates, P.C.

(57) ABSTRACT

A fabrication method of forming curved thermoplastic composite laminate parts with tailored and varying thickness in a continuous process. Automated equipment or hand lay-up are used to collate parts or components into a multi-layer stack. Each stack contains all plies, including ply build-up areas, tacked in the proper location to maintain orientation and location. Ply consolidation tooling contains all necessary part features and is coordinated to the customized multiple ply stacks to form a single integrated thermoplastic composite laminate potentially having areas of differing thickness from the multiple ply stacks.

12 Claims, 6 Drawing Sheets

U.S. PATENT DOCUMENTS

| | | | | |
|---|---|---|---|---|
| 5,026,447 | A | * | 6/1991 | O'Connor ............... 156/166 |
| 5,026,514 | A | * | 6/1991 | Hauwiller et al. ......... 264/258 |
| 5,043,128 | A | * | 8/1991 | Umeda ................ 264/258 |
| 5,057,175 | A | * | 10/1991 | Ashton ................ 156/202 |
| 5,139,407 | A | | 8/1992 | Kim et al. |
| 5,182,060 | A | * | 1/1993 | Berecz ................. 264/70 |
| 5,413,472 | A | | 5/1995 | Dietterich et al. |
| 5,681,513 | A | * | 10/1997 | Farley ................. 264/102 |
| 5,716,487 | A | | 2/1998 | Sumerak |
| 5,759,325 | A | | 6/1998 | Davis |
| 5,820,804 | A | * | 10/1998 | Elmaleh ............... 264/167 |
| 5,958,550 | A | | 9/1999 | Childress |
| 6,007,917 | A | | 12/1999 | Weigel et al. |
| 6,024,555 | A | | 2/2000 | Goodridge et al. |
| 6,162,314 | A | | 12/2000 | Kassuelke et al. |
| 6,291,049 | B1 | | 9/2001 | Kunkel et al. |
| 6,319,346 | B1 | | 11/2001 | Clark et al. |
| 6,425,969 | B1 | | 7/2002 | van den Akker |
| 6,689,448 | B2 | | 2/2004 | George et al. |
| 6,696,009 | B2 | | 2/2004 | Davis |
| 6,764,057 | B2 | | 7/2004 | Fanucci et al. |
| 6,869,558 | B2 | | 3/2005 | Polk, Jr. et al. |
| 7,300,693 | B2 | | 11/2007 | Albers et al. |
| 7,431,875 | B2 | | 10/2008 | Rule |
| 7,513,769 | B2 | | 4/2009 | Benson et al. |
| 7,807,005 | B2 | | 10/2010 | Rubin et al. |
| 7,871,553 | B2 | | 1/2011 | Wilkerson et al. |
| 2002/0088549 | A1 | | 7/2002 | Fanucci et al. |
| 2002/0135093 | A1 | | 9/2002 | Davis |
| 2003/0044570 | A1 | | 3/2003 | George et al. |
| 2003/0175520 | A1 | | 9/2003 | Grutta et al. |
| 2003/0232176 | A1 | | 12/2003 | Polk, Jr. et al. |
| 2004/0009338 | A1 | * | 1/2004 | Jo et al. ............... 428/297.4 |
| 2004/0096535 | A1 | | 5/2004 | Hudecek et al. |
| 2005/0053765 | A1 | | 3/2005 | Albers et al. |
| 2005/0056362 | A1 | * | 3/2005 | Benson et al. ............ 156/163 |
| 2005/0252603 | A1 | | 11/2005 | Rule |
| 2006/0011289 | A1 | | 1/2006 | Suriano |
| 2006/0249868 | A1 | | 11/2006 | Brown et al. |
| 2007/0175571 | A1 | | 8/2007 | Rubin et al. |
| 2007/0175572 | A1 | | 8/2007 | Rubin et al. |
| 2007/0175573 | A1 | | 8/2007 | Fox et al. |
| 2008/0168619 | A1 | | 7/2008 | Gonzalez et al. |
| 2008/0185756 | A1 | | 8/2008 | Wilkerson et al. |
| 2008/0277058 | A1 | | 11/2008 | Schmier, II et al. |
| 2009/0074905 | A1 | | 3/2009 | Matsen et al. |
| 2009/0078362 | A1 | | 3/2009 | Wilkerson et al. |
| 2010/0225016 | A1 | | 9/2010 | Prebil et al. |
| 2010/0319841 | A1 | | 12/2010 | Rubin et al. |
| 2011/0206906 | A1 | | 8/2011 | Rubin et al. |

FOREIGN PATENT DOCUMENTS

| | | | |
|---|---|---|---|
| DE | 1504302 | A1 | 4/1969 |
| DE | 1629830 | A1 | 1/1971 |
| DE | 2165470 | A1 | 7/1973 |
| DE | 2647821 | A1 | 4/1978 |
| DE | 3709480 | A1 | 10/1988 |
| DE | 4017978 | A1 | 12/1991 |
| DE | 29711917 | U1 | 8/1997 |
| EP | 0024895 | A2 | 3/1981 |
| EP | 0277727 | A1 | 8/1988 |
| EP | 0317861 | A2 | 5/1989 |
| EP | 1336469 | A1 | 8/2003 |
| EP | 1504880 | A1 * | 2/2005 |
| EP | 1614624 | A1 | 1/2006 |
| EP | 1666353 | A1 | 6/2006 |
| EP | 1813404 | A2 | 8/2007 |
| EP | 1995040 | A1 | 11/2008 |
| EP | 2014448 | A2 | 1/2009 |
| FR | 2587649 | A1 | 3/1987 |
| FR | 2888155 | A1 | 1/2007 |
| GB | 531357 | | 1/1941 |
| GB | 1157239 | | 7/1969 |
| WO | 8302085 | A1 | 6/1983 |
| WO | 8810186 | A1 | 12/1988 |
| WO | 2007092371 | A2 | 8/2007 |
| WO | 2008073164 | A2 | 6/2008 |
| WO | 2008094227 | A1 | 8/2008 |
| WO | 2008097847 | A1 | 8/2008 |
| WO | 2010101744 | A2 | 9/2010 |
| WO | 2011106117 | A1 | 9/2011 |

OTHER PUBLICATIONS

Thermoplastic Composite Sheet Forming Alfred C. Loos and Romesh C Batra, Department of Engineering Science and Mechanics, VA Polytechnic Institute and State University, Blacksburg, VA 24061.

International Search Report dated Oct. 23, 2007, regarding Application No. PCT/US2007/003021 (WO2007092371), 3 pages.

International Search Report dated Mar. 31, 2008, regarding Application No. PCT/US2007/022234 (WO2008094227), 3 pages.

International Search Report dated Jul. 17, 2008, regarding Application No. PCT/US2008/052806 (WO2008097847), 2 pages.

International Search Report dated Oct. 28, 2010, regarding Application No. PCT/US2010/025176 (WO2010101744), 5 pages.

International Search Report dated Apr. 28, 2011, regarding Application No. PCT/US2011/022003 (WO2011106117), 3 pages.

Prebil et al., U.S. Appl. No. 13/419,187, filed Mar. 13, 2012, 67 pages.

Preliminary Amendment, dated Aug. 1, 2008, regarding U.S. Appl. No. 11/347,122, 39 pages.

USPTO Office Action, dated Mar. 12, 2009, regarding U.S. Appl. No. 11/347,122, 16 pages.

Response to Office Action, dated Apr. 6, 2009, regarding U.S. Appl. No. 11/347,122, 14 pages.

USPTO Final Office Action, dated Jul. 9, 2009, regarding U.S. Appl. No. 11/347,122, 8 pages.

Response to Final Office Action, dated Sep. 9, 2009, regarding U.S. Appl. No. 11/347,122, 13 pages.

USPTO Office Action, dated Nov. 23, 2009, regarding U.S. Appl. No. 11/347,122, 9 pages.

Response to Office Action, dated Mar. 19, 2010, regarding U.S. Appl. No. 11/347,122, 16 pages.

USPTO Final Office Action, dated Jun. 24, 2010, regarding U.S. Appl. No. 11/347,122, 12 pages.

Response to Final Office Action, dated Jun. 29, 2010, regarding U.S. Appl. No. 11/347,122, 9 pages.

USPTO Notice of Allowance, dated Jul. 21, 2010, regarding U.S. Appl. No. 11/347,122, 6 pages.

USPTO Office Action, dated Apr. 15, 2010, regarding U.S. Appl. No. 11/697,378, 28 pages.

USPTO Final Office Action, dated Oct. 27, 2010, regarding U.S. Appl. No. 11/697,378, 20 pages.

USPTO Office Action, dated Jul. 27, 2011, regarding U.S. Appl. No. 11/697,378, 19 pages.

USPTO Final Office Action, dated Mar. 2, 2012, regarding U.S. Appl. No. 11/697,378, 6 pages.

USPTO Office Action, dated Feb. 2, 2010, regarding U.S. Appl. No. 11/699,653, 15 pages.

Response to Office Action, dated Apr. 28, 2010, regarding U.S. Appl. No. 11/699,653, 24 pages.

USPTO Final Office Action, dated Jul. 16, 2010, regarding U.S. Appl. No. 11/699,653, 10 pages.

Response to Final Office Action, dated Nov. 15, 2010, regarding U.S. Appl. No. 11/699,653, 18 pages.

USPTO Office Action, dated Feb. 16, 2011, regarding U.S. Appl. No. 11/699,653, 12 pages.

Response to Office Action, dated May 16, 2011, regarding U.S. Appl. No. 11/699,653, 22 pages.

USPTO Final Office Action, dated Jul. 7, 2011, regarding U.S. Appl. No. 11/699,653, 14 pages.

Response to Final Office Action, dated Oct. 21, 2011, regarding U.S. Appl. No. 11/699,653, 33 pages.

USPTO Office Action, dated Oct. 1, 2009, regarding U.S. Appl. No. 11/701,789, 17 pages.

USPTO Final Office Action, dated Mar. 25, 2010, regarding U.S. Appl. No. 11/701,789, 15 pages.

USPTO Office Action, dated Jun. 21, 2010, regarding U.S. Appl. No. 11/701,789, 11 pages.
USPTO Final Office Action, dated Dec. 29, 2010, regarding U.S. Appl. No. 11/701,789, 14 pages.
USPTO Office Action, dated Apr. 20, 2011, regarding U.S. Appl. No. 11/701,789, 15 pages.
USPTO Final Office Action, dated Oct. 12, 2011, regarding U.S. Appl. No. 11/701,789, 17 pages.
USPTO Office Action, dated Sep. 11, 2009, regarding U.S. Appl. No. 11/859,057, 10 pages.
USPTO Final Office Action, dated Mar. 23, 2010, regarding U.S. Appl. No. 11/859,057, 10 pages.
USPTO Notice of Allowance, dated Oct. 4, 2010, regarding U.S. Appl. No. 11/859,057, 9 pages.
USPTO Office Action, dated Jan. 24, 2011, regarding U.S. Appl. No. 12/398,071, 14 pages.
USPTO Final Office Action, dated Jun. 8, 2011, regarding U.S. Appl. No. 12/398,071, 9 pages.
USPTO Office Action, dated Dec. 16, 2011, regarding U.S. Appl. No. 12/711,401, 21 pages.
USPTO Office Action dated Jun. 18, 2012 regarding U.S. Appl. No. 11/697,378, 20 pages.
USPTO Final Office Action dated Jun. 15, 2012 regarding U.S. Appl. No. 12/711,401, 33 pages.
USPTO Office Action dated Jul. 5, 2012 regarding U.S. Appl. No 11/701,789, 30 pages.

* cited by examiner

METHOD FOR FABRICATING CURVED THERMOPLASTIC COMPOSITE PARTS

CROSS REFERENCE TO RELATED APPLICATIONS

This application is a continuation-in-part of U.S. patent application Ser. No. 11/347,122, filed Feb. 2, 2006 now U.S. Pat. No. 7,807,005.

BACKGROUND OF THE INVENTION

1. Field of the Invention

This invention generally relates to fabrication processes using plastic materials, and more specifically to a novel method for fabricating curved thermoplastic composite parts.

2. Description of the Related Art

Numerous processes exist for the fabrication of Thermoplastic composite (TPC) laminates of constant thickness and straight length. In addition to non-continuous processes such as pressing, stamping and autoclave forming, there are continuous processes such as extrusion, pultrusion, roll forming, and compression molding. Although these latter processes are capable of producing parts in continuous lengths, they lack the ability to produce parts of varying thickness that are needed for lightweight aerospace structures and other structures where weight is of particular importance. Moreover, the processes mentioned above are not capable of producing parts that have curvature along their length.

There thus exists a need to provide a new method that is capable of fabricating curved TPC laminates with tailored thicknesses in a continuous process. Preferably, such a method should be a low cost method and take advantage of automated equipment where possible.

BRIEF SUMMARY OF THE INVENTION

The invention provides an innovative method to fabricate curved thermoplastic composite laminates with tailored and varying thicknesses in a continuous process. This innovative process utilizes automated equipment or hand lay-up to collate parts or components into a multi-layer stack. Each stack contains all plies, including ply build-up areas, tacked in the proper location to maintain orientation and location. The consolidation tooling contains all necessary part features and is coordinated to the customized multiple 2 ply stacks to form a single integrated composite laminate potentially having areas of differing thicknesses from these multiple ply stacks.

The composite part formed by the above method may find use in a wide variety of applications, including, for example, automotive and aerospace applications. One example of a composite part formed in accordance with the invention is ideally suited for use as structural stiffened members in a commercial aircraft.

In accordance with one aspect of the invention, a method is provided for manufacturing a curved thermoplastic laminate part having tailored and varying thickness. The method comprises the steps of: forming a multiple ply stack of thermoplastic material having non-uniform thickness; cutting a curved blank from the stack; feeding the curved blank in a curved path through a pre-forming structure to produce a preformed part; feeding the preformed part in a curved path through a press; and, pressing the preformed part to compact the plies. The plies in the stack are tacked together by local melting of the thermoplastic resin so that the plies are held in fixed relationship to each other. A plurality of part blanks may be cut from each stack of material. Each of the blanks is fed through a pre-forming structure where certain features of the part are preformed before the laminate plies are compacted. Tailored and varying thickness features of the part are formed using curved tools which are placed over the preformed part and fed along with the part into the press. Pressing the curved tool against the preformed part within the press imparts the surface features of the tool into the part as the plies are compacted.

In accordance with another aspect of the invention, a method is provided for manufacturing a curved thermoplastic laminate part having tailored and varying thickness in a continuous process. The method comprises the steps of: feeding a multi-ply thermoplastic laminate blank in a curved path through a pre-forming structure to produce a curved preformed part; feeding the curved preformed part in a curved path through a press; and, pressing the preformed part to compact the plies and impart features into the part defining the tailored and varying thickness. The method may further comprise the steps of forming a multi-ply stack of thermoplastic material having non-uniform thickness, and, cutting the curved blank from the multi-ply stack. The plies in the stack are tacked together so as to hold the plies in fixed relationship to each other as the laminate blank is fed through the pre-forming structure. The curved, preformed part is heated to the melting point of the thermoplastic resin matrix, and then moved through the press in incremental steps so that the press compacts a section of the part after each incremental step.

In accordance with still another aspect of the invention, a method is provided for manufacturing a curved thermoplastic laminate part having tailored and varying thickness features. The method comprises the steps of: forming a curved, multi-ply thermoplastic laminate blank; producing a curved preformed part by deforming portions of the blank; bringing a curved tool into contact with the curved preformed part; feeding the curved preformed part along with the curved tool in a curved path through a compaction press; and, pressing the curved tool and the curved preformed part together to compact the laminate plies and form the tailored and varying thickness. The method may further comprise the steps of forming a multi-ply stack of thermoplastic material having non-uniform thickness; and, cutting the curved blank from the stack of material. A soldering iron or the like may be used to tack the plies together so as to hold the plies in fixed relationship to each other while the blank is being deformed into a preformed part.

Other features, benefits and advantages of the invention will become apparent from the following description of the invention, when viewed in accordance with the attached drawings and appended claims.

DETAILED DESCRIPTION OF THE INVENTION

The invention provides a novel fabrication method of forming a thermoplastic composite ("TPC") laminate material with tailored and varying thicknesses in a continuous process. The invention finds applicable uses in a wide variety of potential applications, including for example, in the aerospace industry. The preferred method of the invention is ideally suited for forming thermoplastic composite stiffened members in the supporting framework of an aircraft fuselage. Potential examples of thermoplastic composite stiffened members include but are not limited to fuselage skins, wing skins, control surfaces, door panels and access panels. Stiffening members include but are not limited to keel beams, floor beams, and deck beams. For illustrative purposes only, the invention will initially be described in reference to forming a thermoplastic composite floor beam 20 for use in a commercial aircraft fuselage. However, while an I-section is shown, other stiffened member geometries such as Z-section, U-section, T-section, etc. will also be later described, including those having curvature along their length.

Figures 1, 2:
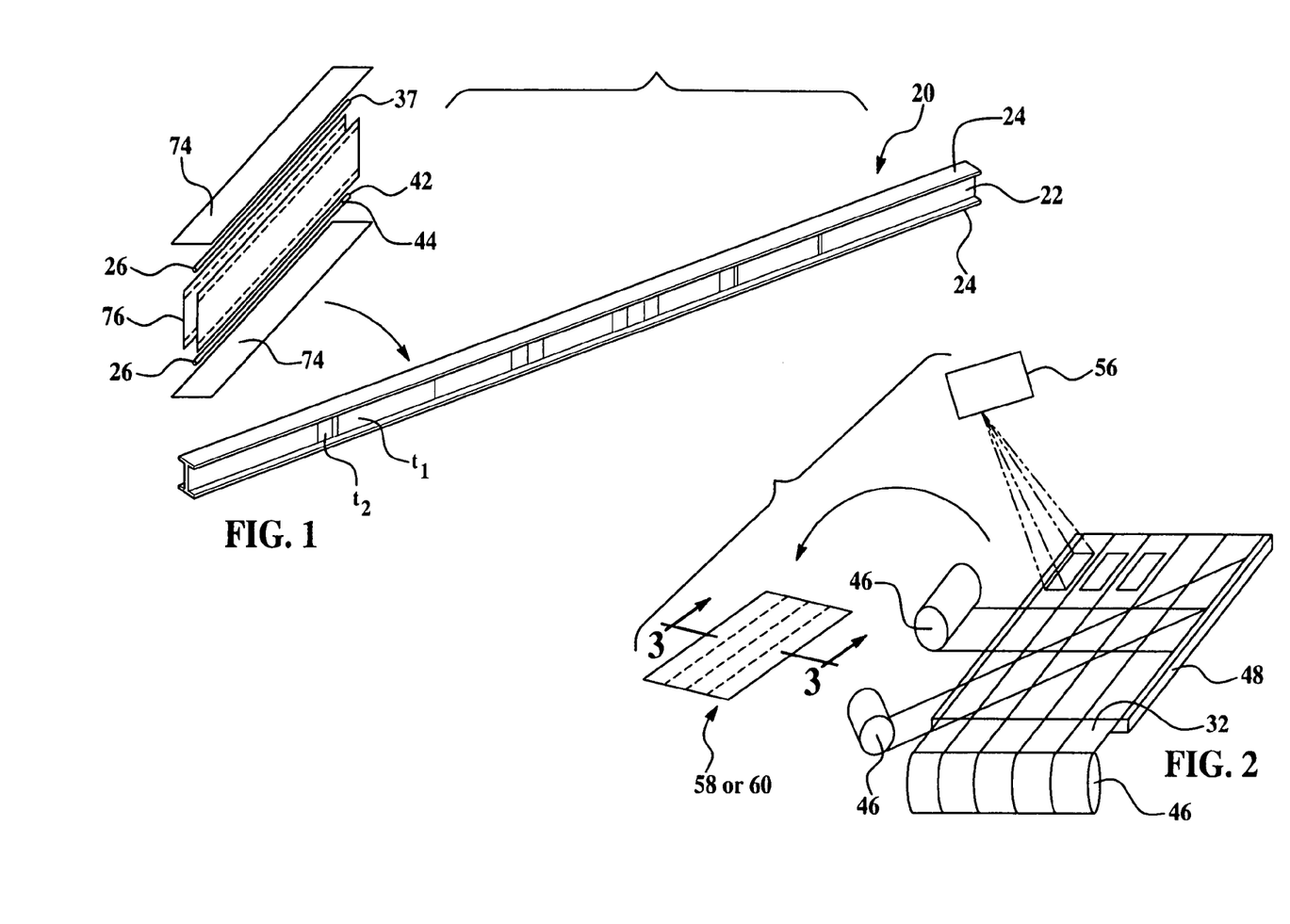
FIG. 1 is an exploded view and perspective view of a thermoplastic composite laminate formed in accordance with a preferred embodiment of the invention.
FIG. 2 is a perspective view of a conveyor table used to form a tailored multiplayer stack.

Referring now to FIG. 1, a thermoplastic composite laminate, here a thermoplastic composite laminate floor beam 20 having tailored and varying thickness regions t1 and t2 is illustrated as having a web region 22 coupled at either end to a respective pair of cap regions 24. The web region 22 and pair of cap regions 24 are formed as a single integrated laminate structure by consolidating a pair of non-uniform thickness tacked multi-layer ply sheet stacks 76 with a pair of thermoplastic composite filler nuggets 26 and further with a pair of uniform thickness tacked multi-layer ply sheet stacks 74. Although sheet stack 76 is shown as comprising 2 plies, it is to be understood that either of the sheet stacks 74 and 76 may include any number of plies, depending on the application. It will also be understood that cap regions 24, which are shown in FIG. 1 as having a uniform thickness and one ply, may similarly be provided with regions of varying thicknesses and/or a plurality of plies.

In alternative versions (not shown), a thermoplastic composite laminate such as the floor beam 20 may alternatively be formed by consolidating one or more uniform or non-uniform tacked multi-layer ply sheets 74,76 with either one or more single ply (shown as 32 in FIGS. 2 and 3) of a thermoplastic composite material 30, one or more partial ply (shown as 34 in FIG. 3) of a thermoplastic material 30, or one or more uniform or non-uniform thickness tacked multi-layer tacked stacks 74, 76, and any combination thereof, in a similar method to that described herein. Further, one or more filler nuggets 26 may also be used in combination thereof to form further alternative versions of the thermoplastic composite laminate 20. The method for forming the thermoplastic composite floor beam 20 as shown in FIG. 1 is described below in more detail in conjunction with FIGS. 2-6.

The thermoplastic materials 30 used in plies 32, 34 include thermoplastic matrix polymers (shown as 40 in FIG. 3) such as polyetheretherketone ("PEEK"), polyetherketoneketone ("PEKK"), polyphenylsulfone ("PPS"), polyetherimide ("PEI") preferably reinforced with a fibrous component (shown as 38 in FIG. 3) such as glass (s-type or e-type) or carbon fiber. The fibers 38 within each ply 32, 34 of the thermoplastic materials 30 may be oriented in a unidirectional or non-uniform arrangement, depending upon the particular application. As one of ordinary skill recognizes, the relative types, thicknesses, amounts of fibers 38 within the matrix resin 40, as well as the type of matrix resin utilized in each ply 32, 34 may vary greatly, based on numerous factors, including cost and the ultimate desired physical and mechanical properties of the thermoplastic laminate composite 20. Further, the relative orientation of the unidirectional fibers in one ply 32, 34 relative to another ply 32, 34 may also affect the mechanical properties of the thermoplastic composite laminate 20.

The nuggets 26 are preferably formed from a thermoplastic material 37 that is compatible with the thermoplastic material 30 via extrusion or other well-known forming process. Preferably the matrix resin composition 42 of the nuggets 26 is the same as the matrix resin composition 40 of the materials 30. In addition, the filler nuggets 26 may utilize fibers 44 similar to the fibers 38 contained within the thermoplastic material 30.

Referring now to the logic flow diagram (FIG. 6) and the processing diagrams (FIGS. 2-5), the method for forming the TPC laminate floor beam 20 of FIG. 1 begins in Step 150 by providing preformed plies 32, 34 of the thermoplastic materials 30 and preformed filler nuggets 26 each retained on roller 46 or other retention devices.

Next, in Step 160, multiple plies 32, 34 of the thermoplastic materials 30 are stacked in a desired configuration to form either a non-uniform thickness or uniform thickness untacked multi-layer ply sheet stack 58 or 60 using either a hand lay-up or automated process.

In the automated process, as shown in FIG. 2, a plurality of plies 32 or 34 (FIG. 3) of the thermoplastic material 30 are unrolled from rollers 46 onto a conveyor table 48 to form a collated multi-layer non-uniform thickness or uniform thickness multi-layer ply stack 58 or 60. The rollers 46 may be situated at one end 50, or along the sides of the conveyor table 48 to lay respective ply layers 32, 34 at a particular orientation with respect to another adjacent layer 32, 34. Thus, for example, a lower layer of a full ply 32 may be laid having unidirectional fibers 38 extending in one direction, while the next respective upper full ply 32 may have unidirectional fibers 38 laid in another direction (for example, at 45 or 90 degrees relative to the underlying ply 32). A laser projector 56 located above the conveyor table 48 ensures proper location of the local or partial plies 34 and/or pockets 36 relative to the full plies 32.

Figure 3:
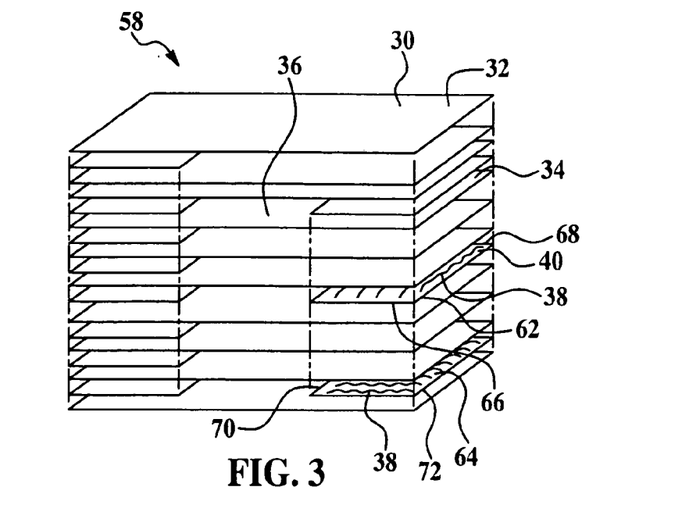
FIG. 3 is a perspective view of one example of a tailored multi-layer stack formed in FIG. 2.

An example of an untacked, non-uniform thickness multi-layer sheet stack 58 made according to the process of FIG. 2 is shown in FIG. 3, which shows various full and partial plies 32, 34 and further showing pockets 36 created between plies 32, 34. Moreover, FIG. 3 shows partial plies 62, 64 having unidirectional fibers 38 laid in a 90-degree relative orientation with respect to one another, here showing partial ply 62 laid in a first orientation (fibers 38 extending from front 66 to back 68), while partial ply 64 is laid in a different orientation (fibers 38 extending from side 70 to side 72). Of course, while not shown, plies may have fibers 38 at other relative orientations to one another, ranging from perpendicular to one another (i.e. a 0/90 arrangement) to parallel with one another (i.e. a 0/0 arrangement) and every conceivable angle therebetween (including, for example a 0/30 orientation, a 0/60, 0, 45, 90 orientation etc.).

Next, in Step 170, some or all of various plies 32, 34 of the untacked stacks 58, 60 formed in FIG. 2 may be tacked together at various predetermined locations to form either a uniform or non-uniform thickness tacked multi-layer ply sheet stack 74, 76. Preferably, the stacks 58, 60 are tacked together using a soldering iron or ultrasonic welder (not shown) to form the respective stack 74, 76, although other devices used to couple together various plies 32, 34 of thermoplastic materials known to those of ordinary skill are also specifically contemplated. The amount and location of tacking among the plies 32, 34 is dependent upon numerous factors, including but not limited to the number and location of the various plies 32, 34 and pockets 64. Moreover, the amount of tacking should be sufficient to form a substantially integrated tacked stack 74, 76 that can be transported as a single part.

In Step 175, the tacked stacks 74, 76 may then be cut into smaller pieces, or are ready for use in forming the thermoplastic composite laminates such as floor beam 20 of FIG. 1.

Next, in Step 180, a combination of at least one uniform or non-uniform thickness tacked stack 74, 76, and at least one of either a non-uniform thickness tacked stack 76, a uniform thickness tacked stack 74, or a single ply 32, and optionally at least one filler nugget 26 of thermoplastic material 30, 37 are fused together in a consolidation structure 78 to form a single integrated thermoplastic composite laminate such as floor beam 20. One preferred consolidation structure 78 specifically designed to form the thermoplastic composite laminate floor beam 20 of FIG. 1 is illustrated in FIGS. 4 and 5 below.

Figure 4:
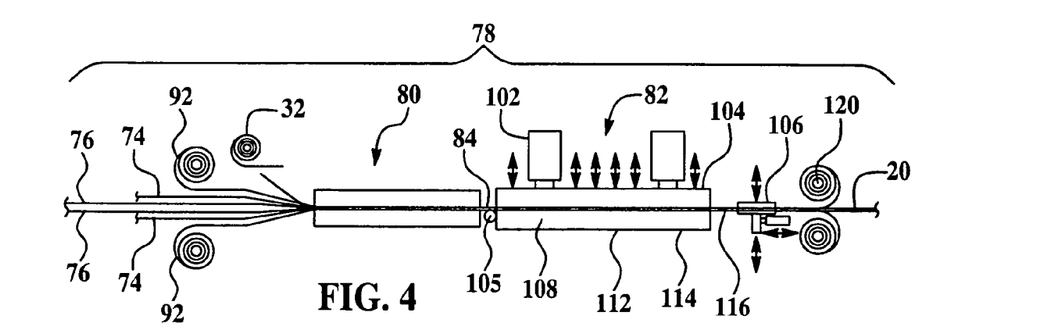
FIG. 4 is a view of a pre-forming zone and a consolidating zone of a consolidation structure used to form the thermoplastic composite laminate of FIG. 1.
Figure 5:
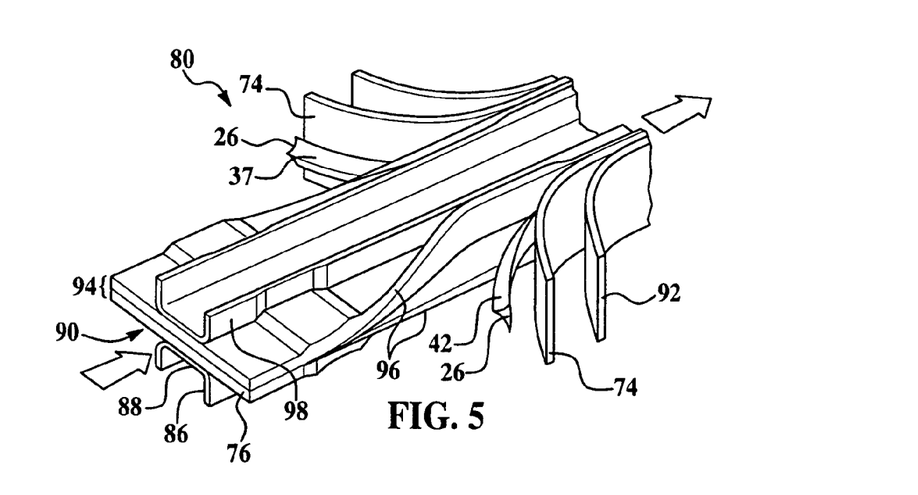
FIG. 5 is a perspective view of the pre-forming zone of the consolidation structure of FIG. 4.
Figure 6:
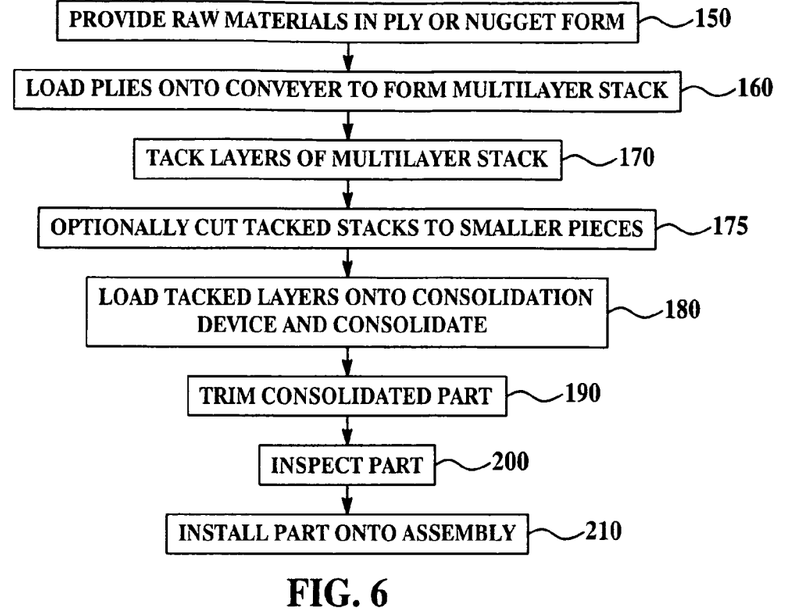
FIG. 6 is a logic flow diagram describing the preferred method for forming the thermoplastic composite laminate of FIG. 1 in accordance with FIGS. 2-5.
Figure 7A:
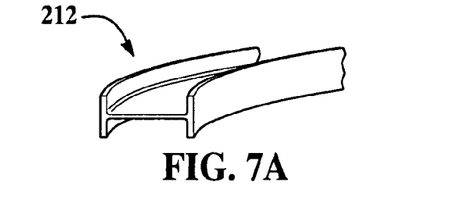
FIGS. 7a-7f are perspective views representing examples of curved, thermoplastic composite laminate parts formed in accordance with the method of the invention.
Figure 7B:
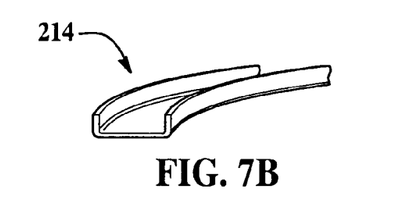
Figure 7C:
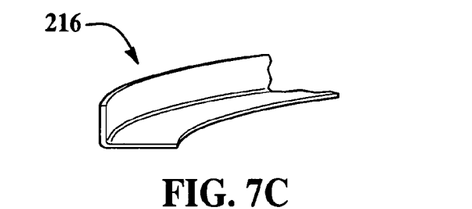
Figure 7D:
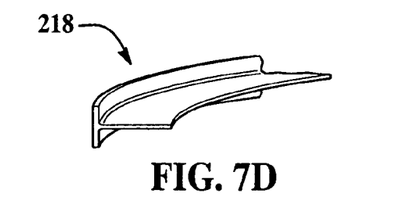
Figure 7E:
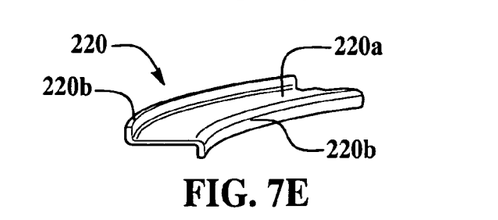
Figure 7F:
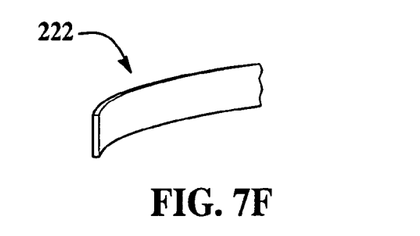

Referring now to FIGS. 4 and 5, the consolidation structure 78 may include a pre-forming zone 80 and a consolidation zone 82. In the performing zone 80, a combination of at least one uniform or non-uniform thickness tacked stack 74, 76, optionally at least one filler nugget 26, and at least one of either a non-uniform thickness tacked stack 76, a uniform thickness tacked stack 74, or a single ply 32, FIGS. 2 and 3, of thermoplastic material are loaded in their proper orientations in a continuous process and preformed to the desired shape at an elevated temperature to form the preformed part 84. The preformed part 84 then exits the performing zone 80 and enters the consolidation zone 82, wherein it is consolidated to form a single, integrated thermoplastic composite laminate such as floor beam 20 as described in FIG. 1 above. The elevated temperature used in performing the part should be sufficiently high to cause softening of the tacked stacks 74, 76 or the single ply 32 so that the layers may be bent during the performing process. However, the elevated temperature should be below a temperature at which the polymeric component of the matrix resin 40, 42 has the consistency of a viscous liquid.

Referring now to FIG. 5, the pre-forming zone 80 of the consolidation structure 78 includes a pair of U-shaped tooling channels 86 having a central portion 88 separated by a gap 90 and a pair of sidetooling sheet members 92. Sheet members 92 may also be called mandrels 92. Preferably, the channels 86 and side-tooling sheet members 92 are formed of materials such as stainless steel and the like, that are capable of handling repetitious, high-heat cycles.

A first pair 94 of tacked stacks 74 or 76 is introduced between the respective central portions 88 and within the gap 90 of the U-shaped channels 86. At the same time, an optional filler nugget 26 and either the additional tacked stack 74 or 76 or ply 32, are introduced along each flange 96 of the first pair 94 and within the respective side-tooling member 92. For the purposes of description in the following paragraphs with respect to the illustrations of FIGS. 4 and 5, the non-uniform thickness tacked stack 76 is shown as the first pair 94 introduced within the gap 90. The uniform thickness tacked stack 74 is shown being introduced at a position between the outer portion 98 of the U-shaped channels 86 and respective side-tooling member 92. Further, the ply layer 32 is not depicted in this description. While not shown, the U-shaped channels 86 include ramps and other features designed to match the laminate thickness variations (corresponding to t1 and t2 in FIG. 1) of the particular material (here the first pair 94 of non-uniform tacked stacks 76).

As the tacked stacks 74, 76 and nuggets 26 move through the performing zone 80 towards the consolidation zone 82, the flanges 96 of the first pair 94 of non-uniform thickness tacked stacks 76 on either side of the u-shaped channel 86 are bent outwardly under heat and pressure away from each other towards the respective outer portions 98 of the U-shaped channel 86. The flanges 96 are therefore coupled flat against the inner side of the uniform or non-uniform thickness tacked stacks 76, with the nuggets 26 located between the flanges 96 and the respective inner end of the uniform or non-uniform thickness tacked stacks 76. The heat within the pre-forming zone 80 is elevated sufficiently to allow deformation of the flanges 96 of the non-uniform thickness tacked stacks 76, but is below the temperature in which the polymeric component of the matrix resin 40, 42 of the respective stacks 74, 76 and nuggets 26 has the consistency of a viscous liquid. Bending of the flanges 96 is initiated by pressure applied to the flange 96 by external forming devices such as rollers (not shown). The side-tooling sheet members 92 squeeze the tacked stack 74 inwardly against the flange 96, causing additional pressure to be applied to the flange 96 which aids in bending the flange 96. The preformed part 84 is then ready to move to the consolidation zone 82.

Figure 16:
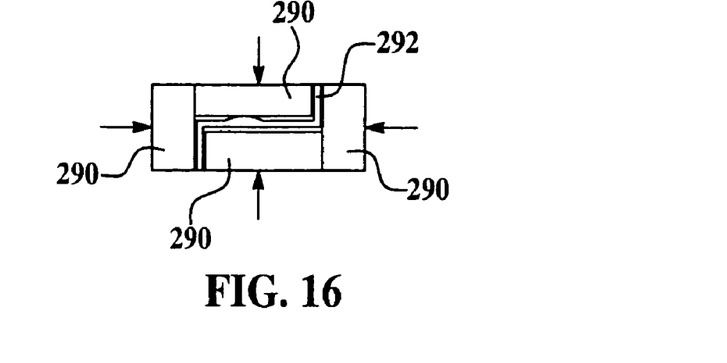
FIG. 16 is a sectional view through the press, showing the dies compressing the preformed part using the consolidation tooling.

As best shown in FIG. 4, the preformed part 84 enters a separate or connected consolidating structure 102 within consolidation zone 82 on guide roller 105. The consolidating structure 102 includes a plurality of standardized tooling dies generally indicated at 104 that are individually mated with the outer surfaces of the U-shaped channels 86 and side-tooling sheet members 92. Additional details of the tooling dies 104 will be discussed later with reference to FIGS. 13 and 16. This commonality of the surfaces between the standardized dies 104 of the consolidating structure 102 and the outer surfaces of the channels 86 and sheet members 92 eliminates the need for part-specific, costly matched dies as well as eliminates start up times between different preformed parts having different ply configurations.

The consolidating structure 102 has a pulsating structure 106 that incrementally moves the preformed part 84 forward within the consolidation zone 82 and away from the pre-forming zone 80. As the part 84 moves forward, the part first enters a heating zone 108 that heats the part to a temperature which allows the free flow of the polymeric component of the matrix resin 40, 42 of the stacks 74, 76 and nuggets 26. Next, the part 84 moves forward to a pressing zone 112, wherein standardized dies 104 are brought down collectively or individually at a predefined force (pressure) sufficient to consolidate (i.e. allow free flow of the matrix resin) the various plies 32, 34 of the tacked stacks 74, 76 and nuggets 26 into its desired shape and thickness, here forming the web region 22 and pair of cap regions 24 of the floor beam 20. Each die 104 is formed having a plurality of different temperature zones with insulators. The dies 104 do not actually contact the part 84, but contact the outer surfaces of the U-shaped channels 86 and sidetooling sheet members 92 opposite the part 84. Thus, the respective inner surfaces of the channels 86, 92 compress against the portion of the part 84. The compression may occur wherein all of the dies 104 compress in one independent yet coordinated step. The dies 104 are opened, and the part 84 is advanced within the consolidating zone 102 away from the pre-forming zone 80. The dies 104 are then closed again, allowing a portion of the part 84 to be compressed under force within a different temperature zone. The process is repeated for each temperature zone of the die 104 as the part 84 is incrementally advanced along the guide rollers 105 towards the cooling zone 114.

The formed and shaped part 84 then enters a cooling zone 114, which is separated from the pressing zone 112, wherein the temperature is brought below the free flowing temperature of the matrix resin 40, 42, thereby causing the fused or consolidated part to harden to its ultimate pressed shape 116. The pressed part 116 then exits the consolidating structure 102, wherein the side sheet members 92 are re-rolled onto rollers 120 as scrap.

While not shown, the consolidating structure 102 may have additional parts or devices that can introduce shapes or features into the pressed shape 116.

One preferred consolidating zone structure 102 that may be utilized is the so-called continuous compression molding ("CCM") process as described in German Patent Application Publication No. 4017978, published on Sep. 30, 1993, and herein incorporated by reference. However, other molding processes known to those of ordinary skill in the art are specifically contemplated by the invention, including but not limited to pultrusion or roll forming.

Next, in Step 190, the pressed part 116 is trimmed or otherwise post-processed to its desired final shape to form the thermoplastic composite laminate 20. In Step 200, the laminate 20 is inspected visually, preferably using ultrasonic non-destructive inspection techniques, or by other means to confirm that the laminate 20 is correctly shaped and does not contain any visual or other defects. After inspection, in Step 210, the laminate 20 such as the thermoplastic composite floor beam 20 may be installed onto its assembly. In the case of the floor beam 20, it is introduced within an aircraft fuselage.

While the invention is described in terms of forming a thermoplastic composite floor beam 20 having essentially an I-beam shape, other potential shapes are specifically contemplated by the invention. This includes thermoplastic composite laminates having an L-shape, a C-shape, a T-shape, or even a flat panel shape in which thickness transitions may occur in any section of the part. These alternatively shaped laminates, or even other forms of the floor beam 20, are formed by consolidating one or more uniform or non-uniform tacked multi-layer ply sheets 74, 76 with either one or more plies 32 of a thermoplastic composite material 30, one or more partial plies 34 of a thermoplastic material 30, or one or more uniform or non-uniform thickness tacked multi-layer tacked stacks 74, 76, and any combination thereof, in a similar method to that described herein. Further, one or more filler nuggets 26 may also be used to form additional alternative versions of the thermoplastic composite laminates 20. To accomplish any of these alternative preferred variations, modifications to the tooling within the pre-forming zone 80 is necessary so as to match the desired thickness variations for the TPC laminate 20. For example, the U-shaped tool 86 of FIG. 5 is specific for forming I-beams such as floor beam 20 of FIG. 1, an alternatively shaped tool 86 having gaps 90 is used in forming C-shaped laminates, L-shaped laminates or flat beams having a taper between respective ply layers. Similar to the U-shaped tool 86, these alternative tools include regions not contacting the stacks 74, 76 that are matched to the standardized dies 104 within the consolidating zone 102.

While the invention is ideally suited for forming thermoplastic composite laminates, by using a modified single-step consolidation zone, thermosetting laminate composites can also be formed. In this modified version of the consolidation process, the heating and pressing zones achieve a temperature above the reaction or curing temperature of the matrix resin to form a thermosetting part. Accordingly, the single pressing process achieves a part having its ultimate desired shape without subsequent pressing steps.

The invention provides an innovative method to fabricate complex thermoplastic composite laminates with tailored and varying thickness in a continuous process. This innovative process utilizes automated equipment or hand lay-up to collate parts or components into a multi-layer stack. Each stack contains all plies, including ply build-up areas, tacked in the proper location to maintain orientation and location. The consolidation structure utilizes a two-stage method for forming the composite laminates from the multi-layer stacks and contains all necessary part features to achieve this result. The tooling, such as the U-shaped tool 86 in the pre-forming zone 80 is created with an appropriate shape to create the desired thickness variations in the formed TPC laminates 20 and is further designed to mate with standardized dies with the consolidation zone 82

The composite part formed by the above method may find use in a wide variety of applications, including, for example, automotive and aerospace applications. One example of a composite part formed in accordance with the invention is ideally suited for use as structural stiffened members, including thermoplastic composite laminate floor beams 20, in a commercial aircraft.

Referring now to FIGS. 7-15, an alternate embodiment of the invention may be used to manufacture thermoplastic laminate parts that are both curved and have tailored and/or varying thickness along their length. Curved laminates can be produced in which the curvature is either constant (circular) or variable along the length of the laminate part. As in the case of the embodiment previously described, the curved thermoplastic laminate part may include tailored areas and areas of varying thickness achieved by adding partial or local plies, or areas containing pockets. "Tailored" or "tailoring" refers to the profile of the part surface, wherein the selective addition or reduction of plies in specific areas of the part can be used to achieve a desired surface profile after the plies are consolidated during the compaction process. Curved parts produced by this embodiment of the method may be used in a variety of applications such as frames, rings, formers and structural aircraft stiffened members or fuselage skins, wing skins, door panels and access panels, keel beams, floor beams, and deck beams. The curved parts can be produced with a variety of cross sections, such as those shown in FIGS. 7a-7f. A fabricated part 212 having an I-section is shown in FIG. 7a while a part 214 having a U-section is shown in FIG. 7b. An L-section part 216 is shown in FIG. 7c and a T-section part is shown in FIG. 7d. A part 220 having a Z-section as shown in FIG. 7e and a part 222 having a simple rectangular section is shown in FIG. 7f. The parts shown in FIGS. 7a-7f may have either constant or variable curvature as previously mentioned, and may include areas of varying or tailored thickness at one or more points along their lengths.

Figure 8:
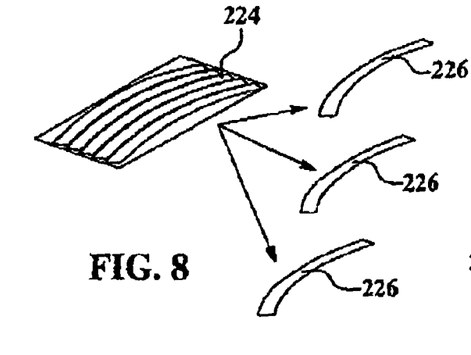
FIG. 8 is a perspective view of a tailored, multilayer stack of thermoplastic composite material, with three curved part blanks cut from the stack.

The preliminary steps in fabricating curved thermoplastic laminate parts in accordance with this embodiment of the method are similar to those previously described. A plurality of plies of thermoplastic material are deposited onto a conveyor table to form a collated, multi-layer non-uniform thickness or uniform thickness multi-ply stack, as previously described in connection with FIG. 2. The resulting, multi-layer stack is thus similar to the stack 58 shown in FIG. 3 which includes full and partial plies 32, 34 as well as pockets 36 created between plies 32, 34. Partial plies 62, 64 may also be included which have unidirectional fibers 38 arranged at alternating angles relative to the direction of orientation of the fibers. As previously described, the sheets in the multi-layer stack 58 are tacked together using a soldering iron or other heating device (not shown) so that the plies are held in fixed relationship to each other. A collated, tacked stack 224 produced by the method previously described is shown in FIG. 8.

The next step in the method for producing the curved composite parts comprises cutting individual part ply stacks or part blanks 226 from the collated stack 224. This cutting operation may be performed, for example, by a water jet cutter (not shown) operating under computer control which produces cut blanks 226 having an outer profile generally corresponding to the desired part curvature. As previously indicated, this curvature may be constant or may vary along the length of the part blank 226.

The part blanks 226 are fed along with a later described set of consolidation tooling 235 to a pre-forming station 275 (FIGS. 14 and 15) in a manner generally similar to that described previously with respect to producing non-curved composite parts. In the case of the present embodiment however, the consolidation tooling 235 and the blanks 226 move through a curved path as they are fed into the pre-forming station 275.

Figure 9:
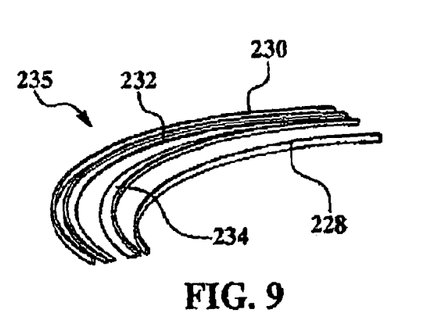
FIG. 9 is a perspective view of tooling used to form the curved thermoplastic composite parts in accordance with the method of the invention.

The consolidation tooling 235 is shown in FIG. 9 and comprises curved inner and outer tooling sleeves 228, 230 as well as upper and lower tooling sleeves 232, 234. The upper and lower tooling sleeves 232, 234 each possess a curvature corresponding to that of the blanks 226, while the inner and outer tooling sleeves 228, 230 may be either similarly curved, or flexible so as to conform to the curvature of the part blank 226 during the pre-forming process. In the example illustrated in FIGS. 9, 14 and 15, the tooling sleeves 228-234 are configured to produce the Z-section part 220 shown in FIG. 7e. Although not specifically shown in the drawings, the part-side surfaces of the tooling sleeves 228-234 contain tooling features that produce mirror image features in the part, such as varying thicknesses, varying curvature, pockets, etc.

Figure 14:
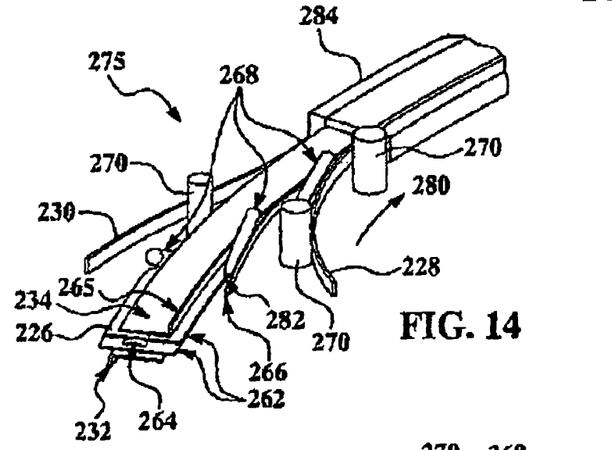
FIG. 14 is a perspective view of a pre-forming structure and a portion of a compaction press used in the method to produce curved composite parts.
Figure 15:
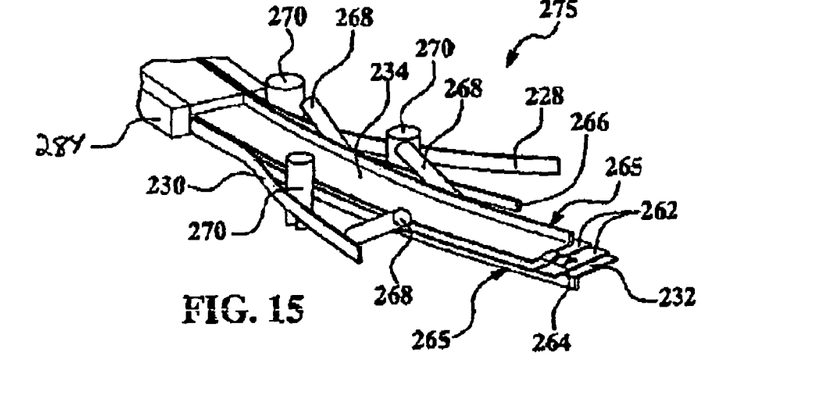
FIG. 15 is a view similar to FIG. 14 but showing the opposite side of the pre-forming structure and press.

Referring now particularly to FIGS. 14 and 15, the upper and lower tooling sleeves 232, 234 are assembled around the part blank 226 before the blank is fed in a curved path 280 into the pre-forming station 275 which includes a plurality of forming devices 268 and a set of guides 270. The part blank 226 can be seen to include a flat tacked stack 262 that comprises the web 220a and cap 220b (FIG. 7e) of the Z-section part 220, and a set of buildup plies 264 which form a local reinforcement of the beam web 220a.

As the sandwiched assembly comprising the part blank 226 and the tooling sleeves 232, 234 is fed into pre-forming station 275, the inner and outer tooling sleeves 228, 230 are fed into contact with the sandwiched assembly. Forming devices 268 function to deform edge portions of a blank 226 against flanges 265 on tooling sleeves 232, 234, thereby pre-forming the caps 220b of the Z-section part 220. Simultaneously, additional cap reinforcement plies 266 are fed between the forming devices 268 and the tooling flange 265. Guides 270 bring the inner and outer tooling sleeves 228, 230 into contact with the edges of the blank 226 which form the caps 220b. The preformed blank 226 along with the tooling sleeves 235 continue their movement in the curve path 280 through a curved press 284 such as a CCM machine which contains dies that impose force on the consolidation tooling 235. This force results in compaction and consolidation of the plies of the preformed part. Although not specifically shown in the drawings, heaters or ovens are provided as necessary to heat the part blank 226 to a temperature at which the polymeric component of the matrix resin in the part blank 226 has the consistency of a viscous liquid. Heating of the part blank 226 in this manner facilitates ply consolidation. In some cases, pre-heating of the part blank 226 may also be required to facilitate the pre-forming process. The need for pre-heating of the part blank 226 can depend on a number of factors, such as the number of plies, ply orientation, the type of material, the shape being preformed, etc.

Figure 17:
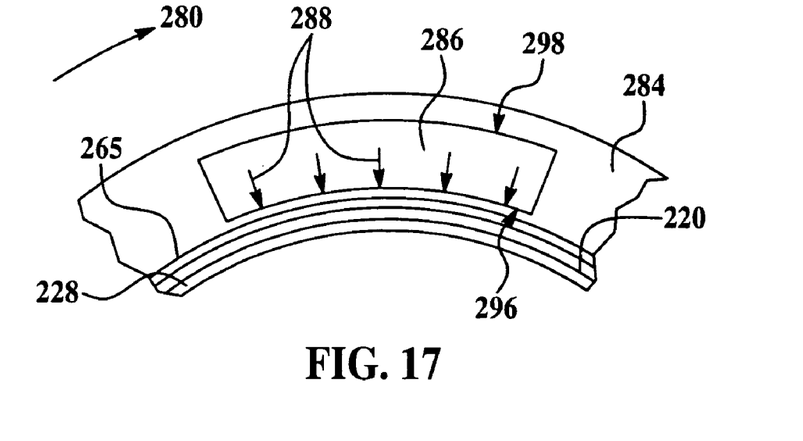
FIG. 17 is a fragmentary view of a section of the press, showing a curved die in relation to tooling sleeves for producing a part having a constant curvature.

The press 284 is essentially similar to that previously described in connection with FIG. 4. However unlike the press shown in FIG. 4, the dies used in press 284 will comprise some degree of curvature to accommodate the curved, preformed part 226. One such die 286 is shown in FIG. 17, where it can be seen that the inner face 296 of the die 286 has a curvature that matches the curvature of the flange 265 on the upper tooling sleeve 232. Die 286 moves inwardly in the direction of the arrows 288, into contact with the flange 265 during the compaction process, and in opposition to another curved die (not shown) which moves into contact with the inner tooling sleeve 228. The amount of curvature of the dies used in press 284 will depend, in part, on the shape of the curved part being produced and the shape of the tooling sleeves necessary for fabrication of the features in the part. The outer face 298 of the die 286 may be curved as shown in the FIG. 17, or may be flat. The preformed part is moved in the curved path 280, incrementally through the press 284. As the part movement is paused at each incremental step, the press dies impose heat and force on the tooling sleeves 235, resulting in consolidation of a section of the plies that lie beneath the dies.

Figure 18:
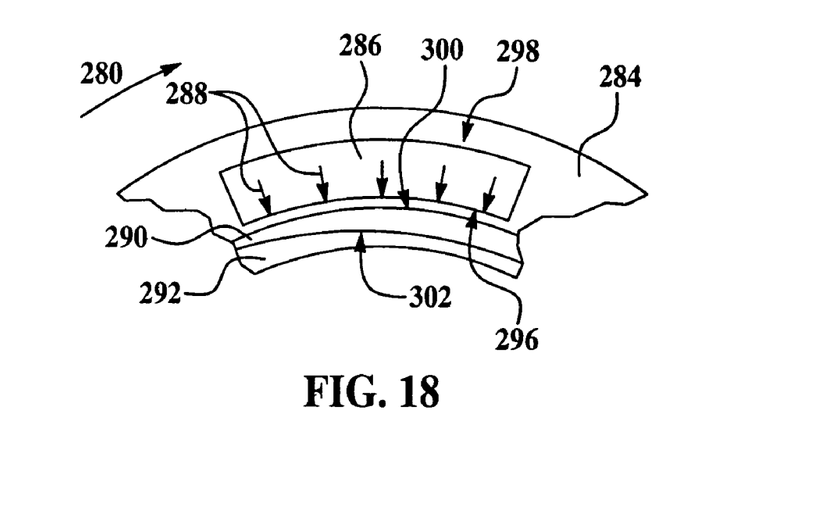
FIG. 18 is view similar to FIG. 17 but showing tooling sleeves for producing a part having a non-uniform curvature.

As previously indicated, the laminated part may have a varying, rather than a constant curvature, along its length, and in this connection attention is directed to FIG. 18. A die 286 used to compact a curved preformed part 292 has a constant curved inner face 296 which engages the outer face 300 of a tooling sleeve 290. The outer face 300 of tooling sleeve 290 has a constant curvature, matching the curvature of the inner face 296 of the die 286, but has an inner face 302 that is curved with a radius different than that of the outer face 300 of the tooling sleeve 290, resulting in a part 292 having a non-constant outer radius.

Figure 10:
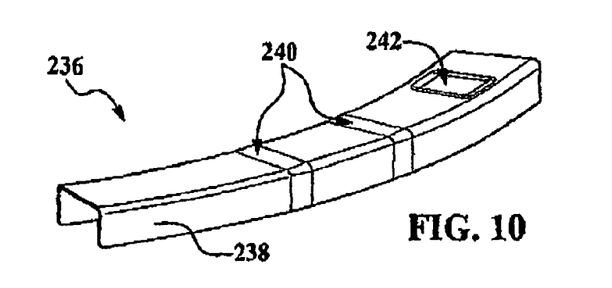
FIG. 10 is a perspective view of a curved tool used to impart features to the curved thermoplastic composite part.
Figure 11:
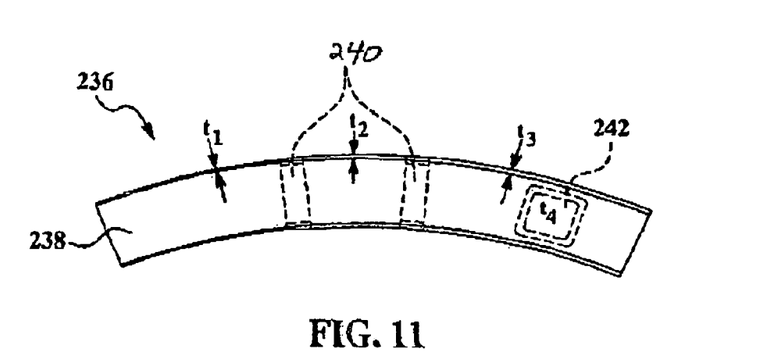
FIG. 11 is a bottom view of the tool shown in FIG. 10.

Another example of a curved thermoplastic laminate part 236 is shown in FIGS. 10 and 11 wherein the part has curvature over its length and has a body 238 which is U-shaped in cross section. The body 238 has a pair of sloped ramps 240 which form transitions in the thickness of the body 238 so that the part 236 has 3 sections of different thicknesses along its length. In addition, the top side of the body 238 is provided with a pocket or depression 242 representing an area of reduced thickness in the part 236. The differing thicknesses of the body 238 are represented by $t_1$, $t_2$, $t_3$, while the thickness of the pocket 244 is represented by $t_4$. Although part 236 possesses constant inner and outer curvatures, it is to be understood that the curvature may vary along the length of the part 236.

Figure 12:
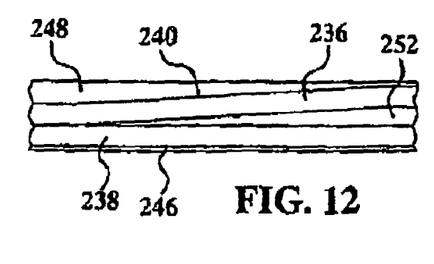
FIG. 12 is a fragmentary, cross sectional view showing a portion of a curve composite part captured between two portions of a tool.

FIG. 12 shows a portion of the part 236 held within tooling sleeves 246, 248 for consolidating the part plies. The part plies 236 can be seen to have a ply buildup area 252 which effectively increases the thickness of the body 238, and results in the slope 240. The tooling sleeves include a release coated metal shim 246 and an outer consolidation tool portion 248 having a ramp for forming the slope 240. As viewed in FIG. 12, the top side of the tooling sleeve 248 is flat so as to be engageable with a universal die, such as any of the dies 256 shown in FIG. 13.

Figure 13:
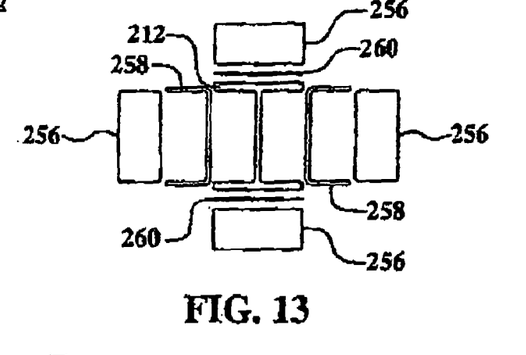
FIG. 13 is an exploded, cross sectional view of a thermoplastic composite I-section beam, shown in operative relationship to tooling and machine press dies used to compact the laminate plies.

FIG. 13 shows another example of a curved part 212 fabricated in accordance with the method of the invention. Part 212 comprises a curved beam having an I-shaped cross section. Conventional machine dies 256 can be used to consolidate parts that have both curvature and varying thickness along their length. In this example, the tooling sleeves comprises a pair of flat metal sheets or shims 260 and a pair of tooling sleeves 258 that are generally U-shaped in cross section. The flat sheets 260 assist in forming the caps of the part 212 while sleeves 258 function to form portions of the cap as well as the web of the part 212. The faces of the sleeves 258 that face the part 212 may have tooling features such as raised areas or ramps that impart mirror image features onto the part 212. Although not specifically shown in FIG. 13, the sheets 260 and tooling sleeves 258 may be curved along their length in order to form a part 212 that is also curved.

While the invention has been described in terms of preferred embodiments, it will be understood, of course, that the invention is not limited thereto since modifications may be made by those skilled in the art, particularly in light of the foregoing teachings.

What is claimed is:

1. A method for manufacturing a curved thermoplastic laminate part, the method comprising:
    placing a curved blank between a first tooling channel and a second tooling channel to form an assembly, wherein the curved blank comprises a curved multiple ply object of non-uniform thickness, wherein the multiple ply object comprises a plurality plies of thermoplastic material;
    feeding the assembly in a curved path through a preforming structure to produce a curved preformed part assembly;
    feeding the curved preformed part assembly in a curved path through a consolidation structure; and
    compressing and heating the curved preformed part assembly within the consolidation structure to form a consolidated curved part assembly; wherein compressing and heating the preformed part assembly consolidates the plies.

2. The method of claim 1, wherein the curved blank is formed by cutting the curved blank from a multiple ply stack of non-uniform thickness, wherein the multiple ply stack comprises a plurality plies of thermoplastic material.

3. The method of claim 1, wherein one of a first face of the first tooling channel and a second face of the second tooling channel each comprise features complimentary to the non-uniform thickness of the curved blank.

4. The method of claim 1, wherein one of a first face of the first tooling channel and a second face of the second tooling channel is configured to impart one or more geometrical features onto the curved blank.

5. The method of claim 1, wherein a first face of the first tooling channel and a second face of the second tooling channel are separated by a gap, and wherein the curved blank is placed within the gap.

6. The method of claim 1, wherein the consolidation structure comprises a die press, and wherein a third face of the first tooling channel is configured to mate with a first die of the die press, and wherein a fourth face of the second tooling channel is configured to mate with a second die of the die press.

7. The method of claim 1, wherein the first tooling channel and the second tooling channel are configured to leave a portion of the curved blank exposed.

8. The method of claim 1, wherein feeding the assembly in a curved path through a preforming structure comprises deforming the curved blank.

9. The method of claim 1, wherein the curved blank further comprises a tacked first ply and a tacked second ply in the curved blank to form a tacked stack in which the first ply and the second ply are held in fixed relationship to each other.

10. The method of claim 1, wherein the thermoplastic material includes a matrix resin component having a free flowing temperature, and the method further comprises:
    heating the preformed part assembly to at least the free flowing temperature of the matrix resin component of the thermoplastic material.

11. The method of claim 1, wherein:
    feeding the preformed part assembly in a curved path through a consolidation structure comprises moving the preformed part assembly through the consolidation structure in incremental steps, and
    wherein the compressing step is performed each time the preformed part is moved through one of the incremental steps.

12. The method of claim 1, wherein the steps are performed in a continuous process.

* * * * *